(12) United States Patent
Tatsuno et al.

(10) Patent No.: US 6,341,027 B1
(45) Date of Patent: Jan. 22, 2002

(54) MODULE FOR OPTICAL COMMUNICATION

(75) Inventors: Kimio Tatsuno, Tokyo; Kouji Yoshida, Kokubunji; Takeshi Kato, Akishima; Toshinori Hirataka, Hachioji; Norihiro Yazaki, Takasaki; Shoichi Takahashi; Hiroshi Naka, both of Komoro, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/037,541

(22) Filed: Mar. 10, 1998

(30) Foreign Application Priority Data

Mar. 13, 1997 (JP) ............................................. 9-059014

(51) Int. Cl.[7] ........................... H04B 10/00; H04B 10/04

(52) U.S. Cl. ........................ 359/163; 359/154; 359/188

(58) Field of Search .................................. 359/188, 195, 359/173, 179, 159, 127, 126; 385/13, 14, 88

(56) References Cited

U.S. PATENT DOCUMENTS

| | | | | |
|---|---|---|---|---|
| 4,849,859 A | * | 7/1989 | Nagasawa | 362/32 |
| 4,880,290 A | * | 11/1989 | Kumazawa et al. | 350/96.2 |
| 5,029,968 A | * | 7/1991 | Geiser | 350/96.2 |
| 5,357,103 A | * | 10/1994 | Sasaki | 250/227.24 |
| 5,416,624 A | * | 5/1995 | Karstensen | 359/114 |
| 5,479,547 A | * | 12/1995 | Kunikane | 385/47 |
| 5,724,464 A | * | 3/1998 | Kozuka | 385/31 |
| 5,737,467 A | * | 4/1998 | Kato et al. | 385/92 |
| 5,960,141 A | * | 9/1999 | Sasaki | 385/88 |

OTHER PUBLICATIONS

Fukuda, M., "Plastic Packaging of Semiconductor Laser Diodes" May 1996 ECTC, pp 1101–1108.*
Yoshida, K., "Optical coupling properties of a waveguide photodiode for use as a backfacet monitor for laser diode modules based on hybrid integration", CLEO, Pacific Rim, Jul. 17, 1997, pp. 125.*
Shiba, T., "High Performance Laser Diode Integrated With Monitoring Photodiode (LD+PD) Fabricated With The Precisely Controlled Dry Etching Technique", 22nd European Conference on Optical Communication, 1996. ECOC '96, Sep. 15–19, 1996, pp. 5.75–5.78.*
Fukuda, M., "Plastic Packaging of Semiconductor Laser Diodes" May 1996 ECTC, pp 1101–1108.*
Yoshida, K., "Optical coupling properties of a waveguide photodiode for use as a backfacet monitor for laser diode modules based on hybrid integration", CLEO, Pacific Rim, Jul. 17, 1997, pp. 125.*

* cited by examiner

Primary Examiner—Jason Chan
Assistant Examiner—Agustin Bello
(74) Attorney, Agent, or Firm—Mattingly, Stanger & Malur, P.C.

(57) ABSTRACT

A module for optical communication includes an optical fiber having an axial-end surface and an optical element having an optical surface facing the axial-end surface in such a manner that light is transmitted between the optical surface and the axial-end surface. The optical surface defines a first plane that is not perpendicular to the longitudinal axis of the optical fiber. A synthetic resin is provided between the optical surface of the optical element and the axial-end surface of the optical fiber so that light is transmitted through the synthetic resin.

31 Claims, 5 Drawing Sheets

MODULE FOR OPTICAL COMMUNICATION

BACKGROUND OF THE INVENTION AND RELATED ART STATEMENT

The present invention relates to a module for optical communication or an optical fiber device.

In a conventional module for optical communication, a metallic package receiving an end of an optical fiber and an optical element in a hermetic sealing manner is used. A replacement of the metallic package by a synthetic resin package is desired to decrease a producing cost of the module.

OBJECT AND SUMMARY OF THE INVENTION

An object of the present invention is to provide a module for optical communication or an optical fiber device in which a reliability of an optical transmission between an optical fiber and an optical element is kept high without a significantly-precise relationship in position and attitude between the optical fiber and the optical element, and/or a metallic hermetic sealing.

According to the present invention, since in a module for optical communication comprising an optical fiber including an axial-end surface, and an optical element including an optical surface facing to the axial-end surface in such a manner that a light is transmitted between the optical surface and the axial-end surface, a transparent solid-state medium, for example, a synthetic resin or glass, is arranged between the optical surface and the axial-end surface so that the light is transmitted through the transparent solid-state medium between the optical surface and the axial-end surface, a volume of atmosphere including humidity between the optical surface and the axial-end surface is minimized to restrain a deterioration of the optical fiber and/or the optical element caused by the humidity. The transparent solid-state medium may be a high-rigidity or hard member such as glass or epoxy-resin, a low-rigidity or soft member an elastomer, a soft viscoelastic elastomer such as silicone resin or the like.

For restraining strongly the deterioration of the optical fiber (the axial-end surface) and/or the optical element (the optical surface) and/or preventing an undesirable reflection at the optical surface toward the axial-end surface, a contact between the transparent solid-state medium and the axial-end surface, and/or a contact between the transparent solid-state medium and the optical surface is effective. For preventing securely the deterioration of the optical fiber (the axial-end surface) and/or the optical element (the optical surface) and/or preventing the undesirable reflection at the optical surface toward the axial-end surface, it is preferable for the transparent solid-state medium to extend continuously or fill completely between the optical surface and the axial-end surface. For preventing securely the deterioration of the optical fiber (the axial-end surface) and/or the optical element (the optical surface) and making an optical characteristic between the optical surface and the axia-end surface constant and correct, it is preferable for the transparent solid-state medium to extend monolithically between the optical surface and the axia-end surface to cover monolithically both of the optical surface and the axial-end surface.

If the optical surface is prevented from extending perpendicularly to a direction of a longitudinal axis of the optical fiber or optical-light-proceeding axis of the optical fiber at the axial-end surface, the light from the axial-end surface is prevented from being reflected toward the axial-end surface by the optical surface.

If a refractive index of the transparent solid-state medium facing to or contacting the axial-end surface is more than that of the atmosphere to decrease a difference between that of the transparent solid-state medium and that of the axial-end surface or optical fiber, for example, not more than that of the optical fiber or axial-end surface, the light is restrained from being reflected or returned by the axial-end surface. If the refractive index of the transparent solid-state medium facing to or contacting the optical surface is more than that of the atmosphere to decrease a difference between that of the transparent solid-state medium and that of the optical element or optical surface, for example, not more than that of the optical element or optical surface, the light is restrained from being reflected or returned by the optical surface. The axial-end surface may extend substantially perpendicularly to the longitudinal axis of the optical fiber at the axial-end surface. The transparent solid-state medium, for example, a glass or synthetic resin, may comprise or be a substantially transparent silicone resin and/or a substantially transparent epoxy resin.

The optical element may perform through the optical surface at least one of emitting the light toward the axial-end surface so that the optical element generates an optical signal to be transmitted through the optical fiber and receiving the light from the axial-end surface so that the optical element generates an electric signal from the light transmitted through the optical fiber. The optical element may include a light generator and a light beam cross-sectional area expanding element arranged between the light generator and the axial-end surface to increase a cross-sectional area of the light (along an imaginary plane perpendicular to a proceeding axis or direction of the light) supplied to the axial-end surface in comparison with that of the light at the light generator, and the optical surface may be formed on the light beam cross-sectional area expanding element.

The optical fiber may be substantially surrounded at an axial-end thereof by the solid-state medium in an airtight sealing manner, so that the axial-end of the optical fiber is securely prevented from being deteriorated by the atmosphere.

DETAILED DESCRIPTION OF PREFERRED EMBODIMENTS

Figure 1:
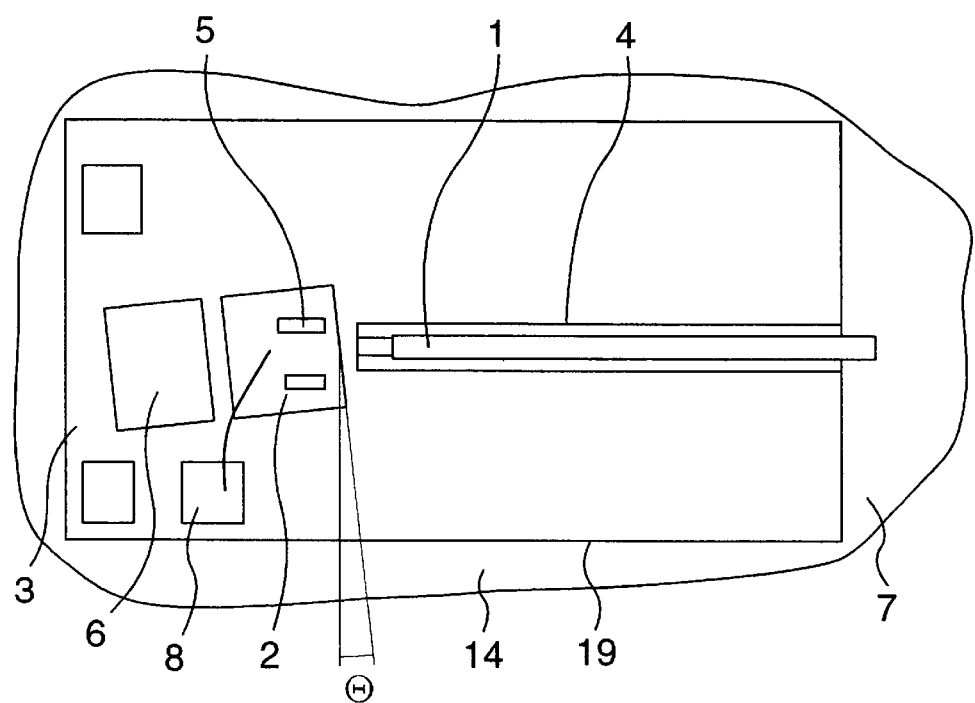
FIG. 1 is a partial front view of a first embodiment of the invention.
Figure 2:
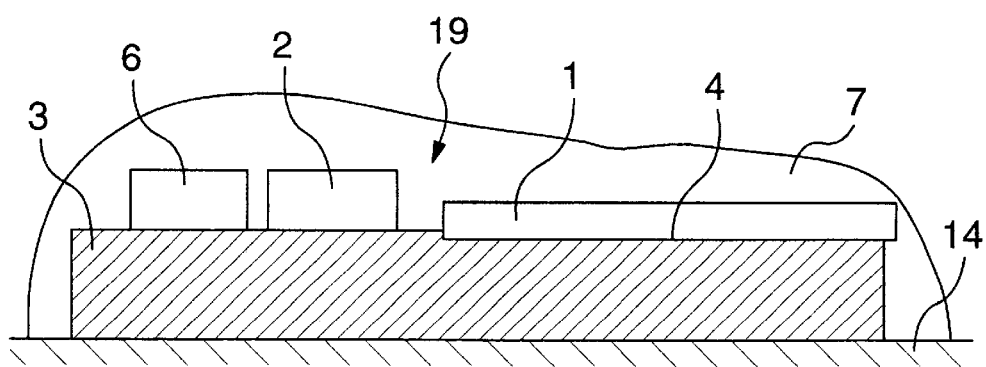
FIG. 2 is a partial cross-sectional side view of the first embodiment.
Figure 3:
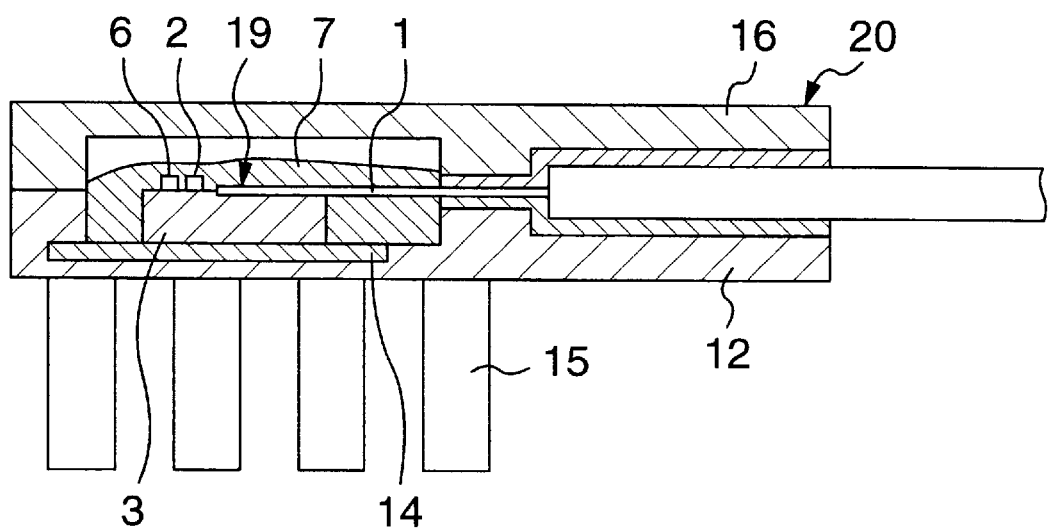
FIG. 3 is another partial cross-sectional side view of the first embodiment.
Figure 4:
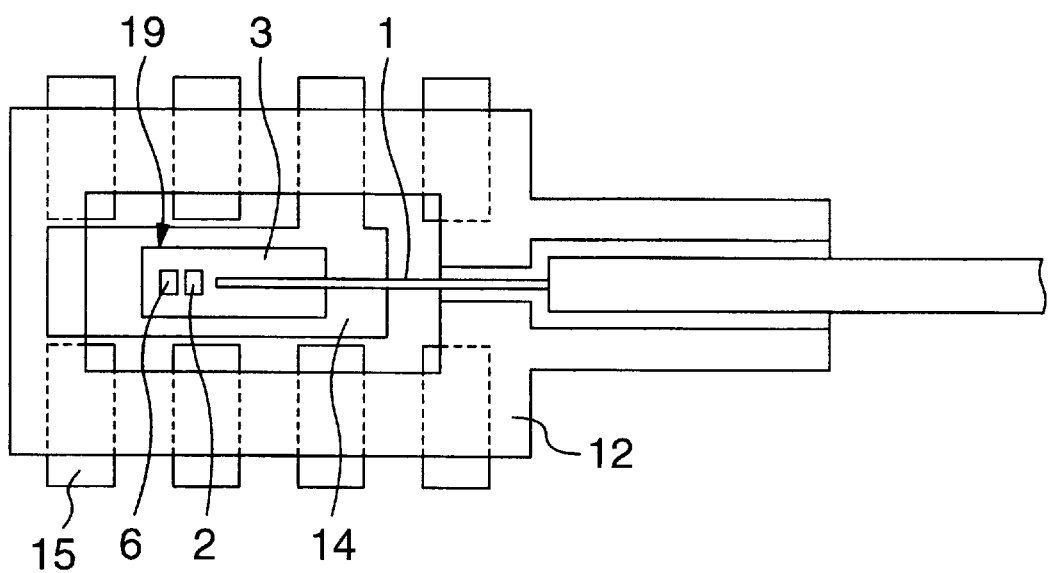
FIG. 4 is another partial front view of the first embodiment.
Figure 5:
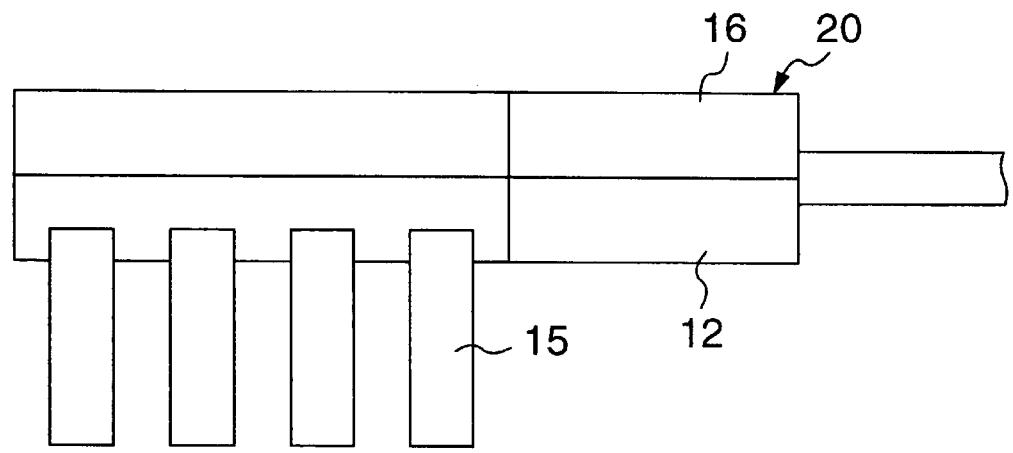
FIG. 5 is a partial side view of the first embodiment.

As shown in FIGS. 1–5, a plastic case 12 made through an injection or transfer molding receives a die pad 14 and a lead frame 15, and a part of the lead frame and the die pad 14 are joined. A substrate 3 with a V-shaped groove 4 is adhered onto the die pad 14 by an electrically conductive adhesive, an optical fiber 1 is mounted in the V-shaped groove 4, and an axial end surface of the optical fiber 1 extends substantially perpendicularly to a longitudinal axis of the optical fiber 1 or a light proceeding axis in the optical fiber 1 at an axial end of the optical fiber 1. An optical element 2 (a semiconductor laser generator emitting a light through an optical surface thereof and/or a photo-electric detector receiving the light from the axial-end surface through the optical surface thereof so that the photo-electric detector generates an electric signal from the light or optical signal transmitted through the optical fiber 1) and a reflection-type or wave-guide type optical detector 6 for monitoring an output of the semiconductor laser generator 2 are mounted on the substrate 3, an electrode 8 is arranged on the substrate 3 to be electrically connected to the optical element 2, and the optical surface of the optical element 2 is inclined by an angle θ (for example, not less than 0.5 degrees when a distance between the optical surface of the optical element 2 and the axial end of the optical fiber 1 is not more than 100 μm, not less than 1.0 degree when the distance therebetween is not more than 80 μm, or not less than 1.6 degree when the distance therebetween is not more than 50 μm) relative to an imaginary plane perpendicular to the light proceeding axis in the optical fiber 1 at the axial end of the optical fiber 1 so that an amount of light supplied from the optical fiber 1 and returned or reflected by the optical surface of the optical element 2 to the axial end of the optical fiber 1 is decreased.

An index mark 5 is formed on the substrate 3 on the basis of which another index mark (not shown) on a reverse surface of the optical element 2 is positioned correctly to making a positional relationship between the optical element 2 and the optical fiber 1 correct. The optical element 2 is soldered to the substrate 3. The axial end of the optical fiber 1, the optical element 2, the optical detector 6 and the substrate 3 form a sub-assembly 19, and a glass or synthetic resin 7 as a solid-state medium substantially transparent relative to a wavelength of the light, (for example, a silicone resin or an epoxy resin) receives therein or covers the sub-assembly 19, that is, is cured to fill a space between the axial end of the optical fiber 1 and the optical surface of the optical element 2, without a clearance, gas or air between the sub-assembly 19 and the glass or synthetic resin 7, so that the light passes through the glass or synthetic resin 7 filling between the axial-end surface of the optical fiber 1 and the optical surface of the optical element 2 and between the optical element 2 and the optical detector 6. A cap 16 is adhered to the plastic case 12 to form a plastic package 20 receiving the glass or synthetic resin 7 surrounding the sub-assembly 19.

A reflectance R between two substances contacting each other is calculated through the following formula, when a refractive index of one of the substances is n1, and that of another thereof is n2.

$$R=(n1-n2)2/(n1+n2)2$$

A refractive index of a glass forming the axial-end surface of the optical fiber 1 is 1.5, that of the silicone resin 7 is 1.45, and that of the atmosphere is 1.0. Therefore, a reflectance R between the axial-end surface of the optical fiber 1 and the synthetic resin 7 is significantly smaller than a reflectance R between the axial-end surface of the optical fiber 1 and the atmosphere so that a reflection of the light by the axial-end surface of the optical fiber 1 is prevented by the silicone resin 7 contacting the axial-end surface of the optical fiber 1.

Further, since a difference between the refractive index of the synthetic resin 7 and that of the axial-end surface of the optical fiber 1 contacting the synthetic resin 7 is small, the cross sectional shape and size of the light are restrained from being changed between the synthetic resin 7 and the axial-end surface of the optical fiber 1.

Since the optical surface of the optical element 2 is prevented from extending perpendicularly to a direction of the light proceeding axis in the optical fiber 1 at the axial end of the optical fiber 1, the light reaching the optical surface of the optical element 2 through the synthetic resin 7 from the axial-end surface of the optical fiber 1 is prevented from being reflected or returned toward the axial-end surface of the optical fiber 1 by the optical surface of the optical element 2.

An angle of diffraction θ by medium is calculated through the following formula, when a refractive index of the medium is n, a spot or cross-sectional diameter of the light beam reaching or taken into a light inlet face of the medium is D, and a wavelength of the light is λ.

$$\theta=\lambda/(n \cdot D)$$

Since the refractive index of the silicone or epoxy resin 7 is larger than that of the atmosphere, an angle of diffraction θ by the silicone or epoxy resin 7 is smaller than an angle of diffraction θ by the atmosphere. Since the smaller the refractive index is, the larger a tolerance for positional relationship between the optical surface of the optical element 2 and the axial end surface of the optical fiber 1 is, a positioning between the optical surface of the optical element 2 and the axial end surface of the optical fiber 1 can be easily performed.

Figure 6:
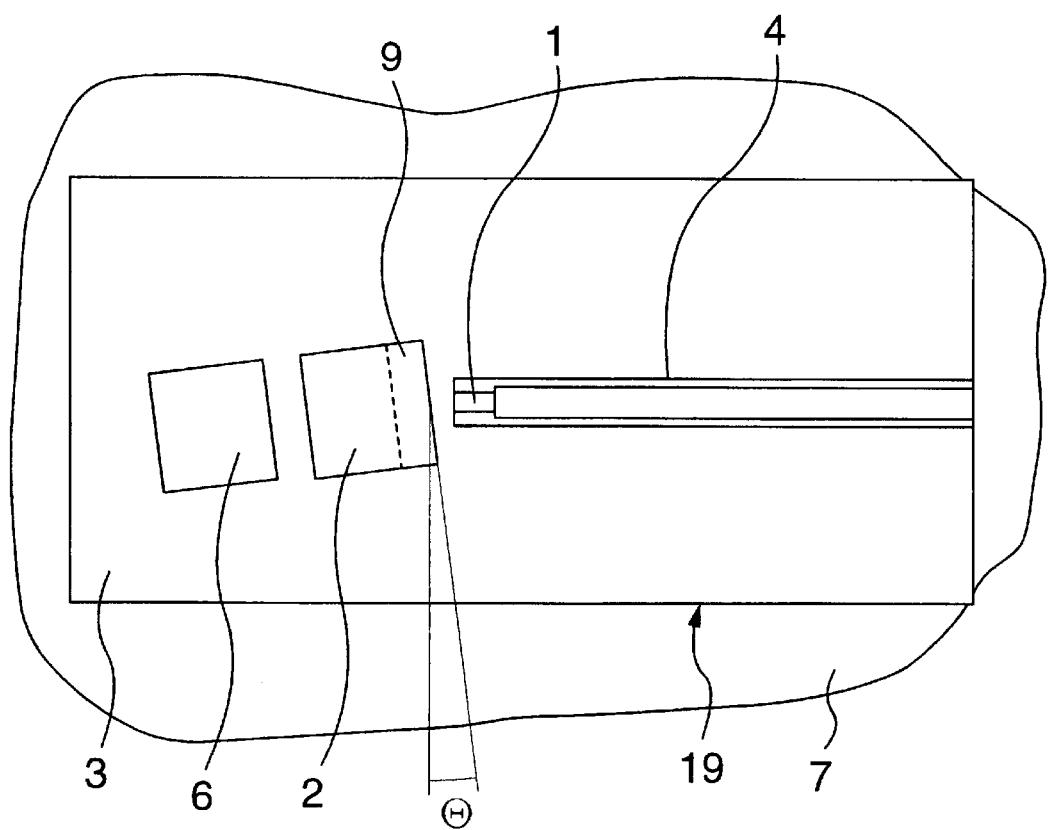
FIG. 6 is another partial front view of the first embodiment.

As shown in FIG. 6, the optical element 27 includes a monolithic combination of the semiconductor laser generator and a light beam cross-sectional area or spot-diameter expanding element 9, for example, a tapered wave guide whose wave guide layer is tapered gradually in a thickness direction thereof. Since a light strength distribution is expanded by the wave guide 9, an angle of diffraction of the light emitted from the optical surface (formed on the wave guide 9) through the synthetic resin 7 toward the axial end surface of the optical fiber 1 is decreased. Therefore, the light is effectively transmitted to the optical fiber 1.

Figure 7:
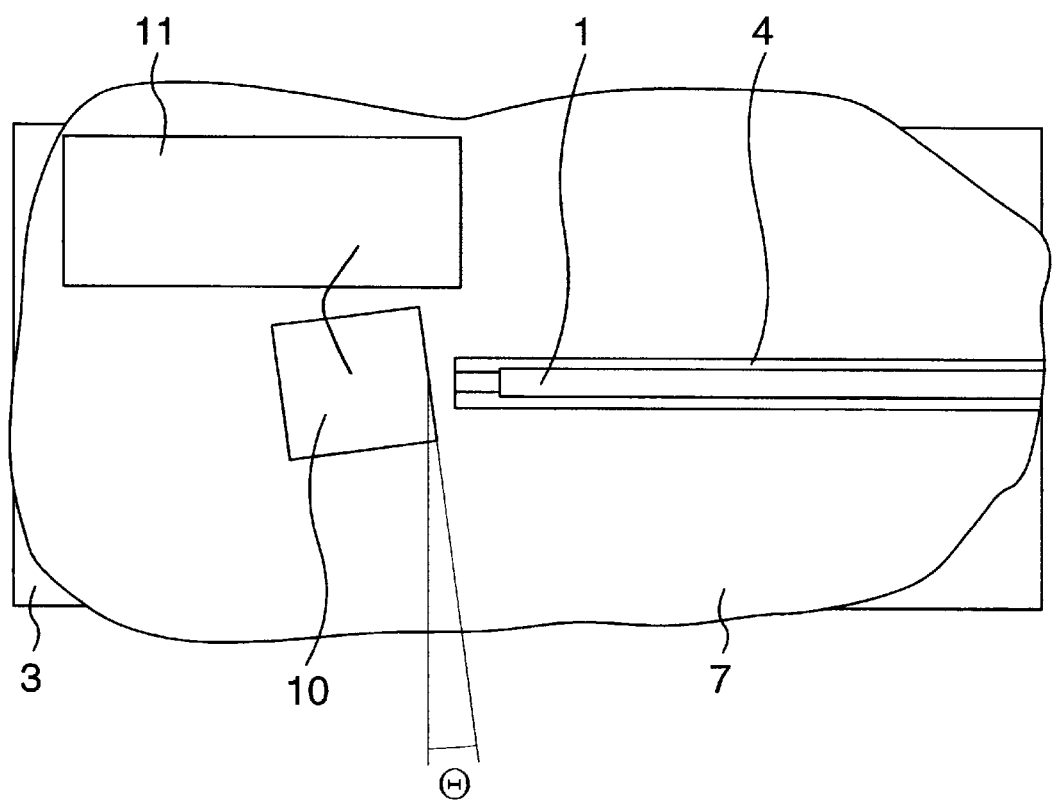
FIG. 7 is a partial front view of a second embodiment of the invention.

As shown in FIG. 7, the optical element 2 is replaced by a photo-electric element 10 for generating an electric signal in accordance with the light transmitted through the optical surface from the optical fiber 1 and a preamplifier 11 for amplifying the electric signal. The optical surface is formed on the photo-electric element 10 as the optical element, and is prevented from extending perpendicularly to the direction of the light proceeding axis in the optical fiber 1 at the axial end of the optical fiber 1. The axial end of the optical fiber 1, the photo-electric element 10, the preamplifier 11 and the substrate 3 form a sub-assembly. The synthetic resin 7, (for example, the silicone resin) receives therein or covers the sub-assembly without a clearance between the sub-assembly and the silicone resin 7.

Figure 8:
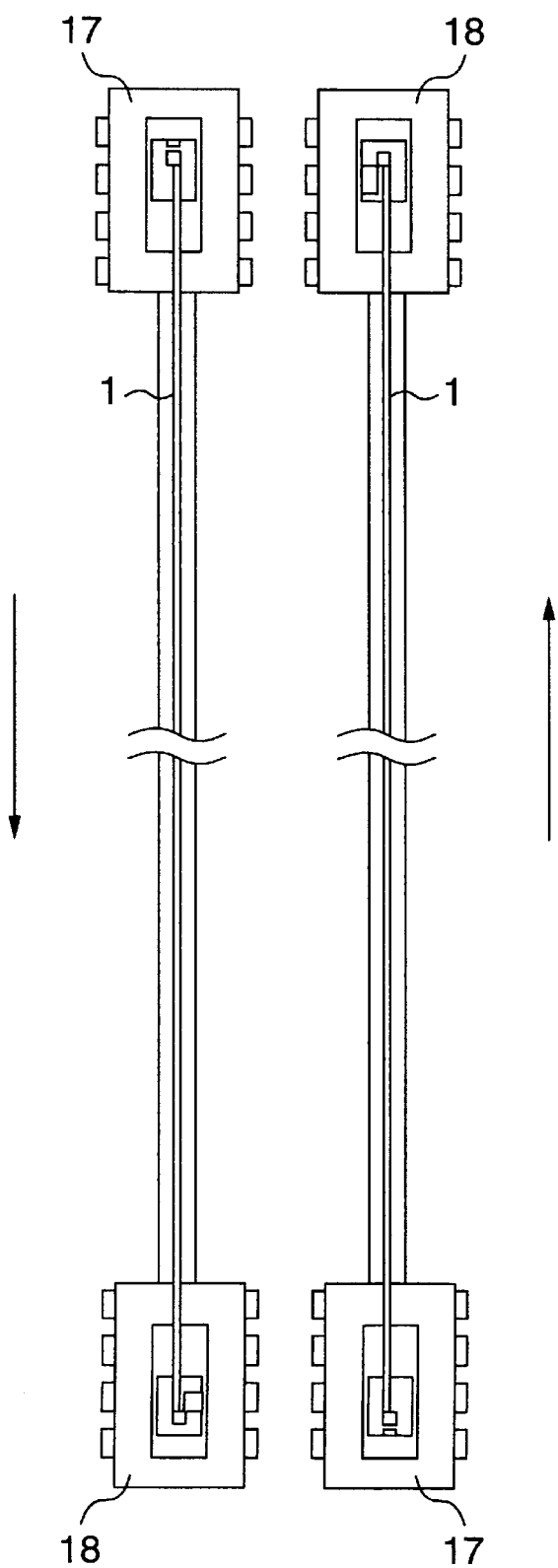
FIG. 8 is a front view showing a pair of optical fiber devices of the present invention for mutual optical communication.

FIG. 8 shows a pair of optical fiber modules for mutual optical communication, each of the optical fiber modules having an optical signal generating part 17 including the semiconductor laser generator and an electric signal generating part 18 including the photo-electric detector. The optical fiber module may have a plurality of the electric signal generating parts 18 diverging from the optical fiber 1.

What is claimed is:

1. A module for optical communication, comprising
   an optical fiber including an axial-end surface,
   an optical element including an optical surface facing to the axial-end surface in such a manner that light is transmitted between the optical surface and the axial-end surface;

a transparent material arranged between the optical surface and the axial-end surface so that the light is transmitted through the transparent material between the optical surface and the axial-end surface; and a plastic package sealing the optical fiber, the optical element and the transparent material, wherein the optical surface defines a first plane that is not perpendicular to a direction of a longitudinal axis of the optical fiber at the axial-end surface; and wherein the axial-end surface defines a second plane that is perpendicular to the longitudinal axis of the optical fiber at the axial-end surface, wherein the first plane and the second plane have a predetermined angle being substantially larger than zero degrees, wherein the first plane and the second plane may have a further manufacturing error angle, wherein a distance between the optical surface and the axial-end surface is predetermined; and wherein a total angle of the predetermined angle and the further manufacturing error angle is larger than 0.5 degrees.

2. A module for optical communication according to claim 1, wherein the transparent material contacts the axial-end surface.

3. A module for optical communication according to claim 1, wherein the transparent material contacts the optical surface.

4. A module for optical communication according to claim 1, wherein the transparent material extends continuously between the optical surface and the axial-end surface.

5. A module for optical communication according to claim 1, wherein the transparent material extends monolithically to cover both of the optical surface and the axial-end surface.

6. A module for optical communication according to claim 1, wherein a refractive index of the transparent material facing to the axial-end surface is more than that of the atmosphere.

7. A module for optical communication according to claim 1, wherein a refractive index of the transparent material facing to the axial-end surface is more than that of the atmosphere and not more than that of the axial-end surface.

8. A module for optical communication according to claim 1, wherein a refractive index of the transparent material facing to the optical surface is more than that of the atmosphere.

9. A module for optical communication according to claim 1, wherein a refractive index of the transparent material facing to the optical surface is more than that of the atmosphere and not more than that of the optical surface.

10. A module for optical communication according to claim 1, wherein the transparent material comprises at least one of a substantially transparent glass, a substantially-transparent-silicone resin and a substantially-transparent-epoxy resin.

11. A module for optical communication according to claim 1, wherein the optical element performs through the optical surface at least one of emitting the light toward the axial-end surface so that the optical element generates an optical signal to be transmitted through the optical fiber and receiving the light from the axial-end surface so that the optical element generates an electric signal from the light transmitted through the optical fiber.

12. A module for optical communication according to claim 1, wherein the optical element includes a light generator and a light beam cross-sectional area expanding element arranged between the light generator and the axial-end surface to increase a cross-sectional area of the light supplied to the axial-end surface in comparison with that of the light at the light generator, and the optical surface is formed on the light beam cross-sectional area expanding element.

13. A module for optical communication according to claim 1, wherein at least one of a gas and an air is prevented from being arranged on at least one of the axial-end surface and the optical surface.

14. A module for optical communication according to claim 1, wherein the optical element includes a light detector to monitor an output of the light from the optical element.

15. A module for optical communication according to claim 1, wherein the optical fiber is surrounded by the transparent material in an airtight sealing manner.

16. A module for optical communication according to claim 1, wherein the optical surface is inclined relative to the axial-end surface so that an amount of light reflected by the optical surface to the axial-end surface is decreased.

17. A module for optical communication according to claim 1, wherein the optical element performs emitting the light through the optical surface toward the axial-end surface so that the optical element generates an optical signal to be transmitted through the optical fiber.

18. A module for optical communication according to claim 1, wherein the optical surface is substantially planar.

19. A module for optical communications according to claim 1, wherein the axial-end surface is substantially planar.

20. A module for optical communication, comprising an optical fiber including an axial-end surface, and an optical element including an optical surface facing the axial-end surface in such a manner that light is transmitted between the optical surface and the axial-end surface; and a plastic package sealing the optical fiber and the optical element, wherein the optical surface does not extend perpendicularly to a direction of a longitudinal axis of the optical fiber at the axial-end surface;

wherein the axial-end surface defines a second plane that is perpendicular to the longitudinal axis of the optical fiber at the axial-end surface, wherein the first plane and the second plane have a predetermined angle being substantially larger than zero degrees;

wherein the first plane and the second plane may have a further manufacturing error angle, wherein a distance between the optical surface and the axial-end surface is predetermined; and wherein a total angle of the predetermined angle and the further manufacturing error angle is larger than 0.5 degrees.

21. A module for optical communication according to claim 20, wherein the optical surface is inclined relative to the axial-end surface so that an amount of light reflected by the optical surface to the axial-end surface is decreased.

22. A module for optical communication, comprising:

an optical fiber including an axial-end surface;

an optical element including an optical surface facing to the axial-end surface in such a manner that light is transmitted between the optical surface and the axial-end surface; and a transparent material arranged between the optical surface and the axial-end surface so that the light is transmitted through the transparent material between the optical surface and the axial-end surface;

wherein the optical surface defines a first plane that is not perpendicular to a direction of a longitudinal axis of the optical fiber and the axial-end surface;

wherein the axial-end surface defines a second plane that is perpendicular to the longitudinal axis of the optical fiber at the axial-end surface; and wherein an angle by which the optical surface is inclined relative to the axial-end surface is not less than 0.5 degree when a distance between the optical surface and the axial-end surface is not more than 100 µm.

23. A module for optical communication, comprising:

an optical fiber including an axial-end surface;

an optical element including an optical surface facing to the axial-end surface in such a manner that light is transmitted between the optical surface and the axial-end surface; and a transparent material arranged between the optical surface and the axial-end surface so that the light is transmitted through the transparent material between the optical surface and the axial-end surface;

wherein the optical surface defines a first plane that is not perpendicular to a direction of a longitudinal axis of the optical fiber and the axial-end surface;

wherein the axial-end surface defines a second plane that is perpendicular to the longitudinal axis of the optical fiber at the axial-end surface; and wherein an angle by which the optical surface is inclined relative to the axial-end surface is not less than 1.0 degree when a distance between the optical surface and the axial-end surface is not more than 80 µm.

24. A module for optical communication, comprising:

an optical fiber including an axial-end surface;

an optical element including an optical surface facing to the axial-end surface in such a manner that light is transmitted between the optical surface and the axial-end surface; and a transparent material arranged between the optical surface and the axial-end surface so that the light is transmitted through the transparent material between the optical surface and the axial-end surface;

wherein the optical surface defines a first plane that is not perpendicular to a direction of a longitudinal axis of the optical fiber and the axial-end surface;

wherein the axial-end surface defines a second plane that is perpendicular to the longitudinal axis of the optical fiber at the axial-end surface; and wherein an angle by which the optical surface is inclined relative to the axial-end surface is not less than 1.6 degrees when a distance between the optical surface and the axial-end surface is not more than 50 µm.

25. A module for optical communication, comprising;

an optical fiber including an axial-end surface;

an optical element including an optical surface facing to the axial-end surface in such a manner that light is transmitted between the optical surface and the axial-end surface;

wherein the optical surface does not extend perpendicularly to a direction of a longitudinal axis of the optical fiber at the axial-end surface, wherein the axial-end surface defines a second plane that is perpendicular to the longitudinal axis of the optical fiber at the axial-end surface; and wherein an angle by which the optical surface is inclined relative to the axial-end surface is not less than 0.5 degree when a distance between the optical surface and the axial-end surface is not more than 100 µm.

26. A module for optical communication, comprising:

an optical fiber including an axial-end surface;

an optical element including an optical surface facing to the axial-end surface in such a manner that light is transmitted between the optical surface and the axial-end surface;

wherein the optical surface does not extend perpendicularly to a direction of a longitudinal axis of the optical fiber at the axial-end surface, wherein the axial-end surface defines a second plane that is perpendicular to the longitudinal axis of the optical fiber at the axial-end surface; and wherein an angle by which the optical surface is inclined relative to the axial-end surface is not less than 1.0 degree when a distance between the optical surface and the axial-end surface is not more than 80 µm.

27. A module for optical communication, comprising:

an optical fiber including an axial-end surface;

an optical element including an optical surface facing to the axial-end surface in such a manner that light is transmitted between the optical surface and the axial-end surface;

wherein the optical surface does not extend perpendicularly to a direction of a longitudinal axis of the optical fiber at the axial-end surface, wherein the axial-end surface defines a second plane that is perpendicular to the longitudinal axis of the optical fiber at the axial-end surface; and wherein an angle by which the optical surface is inclined relative to the axial-end surface is not less than 1.6 degrees when a distance between the optical surface and the axial-end surface is not more than 50 µm.

28. A method for producing a module for optical communication, comprising the steps of:

making a positional relationship between an optical element and an optical fiber so that an axial-end surface of the optical fiber and an optical surface of the optical element have a predetermined angle being substantially larger than zero degree, and filling with a transparent material a space between an axial-end surface of the optical fiber and an optical surface of the optical element so that a light is transmitted through the transparent material between the optical surface and the axial-end surface, wherein the optical surface is prevented from extending perpendicular to a direction of a longitudinal axis of the optical fiber at the axial-end surface, and the axial-end surface extends substantially perpendicular to the longitudinal axis of the optical fiber at the axial-end surface, wherein the optical surface and the axial-end surface may have a further manufacturing error angle, wherein a distance between the optical surface and the axial-end surface is predetermined, and wherein a total angle of the predetermined angle and the further manufacturing error angle is larger than 0.5 degree.

29. A method for producing a module for optical communication according to claim 28, wherein said transparent material is a synthetic resin.

30. A method for producing a module for optical communication according to claim 29, wherein said synthetic resin includes a substantially transparent silicone resin.

31. A method for producing a module for optical communication according to claim 29, wherein said synthetic resin includes a substantially transparent epoxy resin.

* * * * *